US010589477B2

(12) United States Patent
Huang et al.

(10) Patent No.: US 10,589,477 B2
(45) Date of Patent: Mar. 17, 2020

(54) COSMETIC REPAIR OF A THERMOPLASTIC CARBON FIBER COMPOSITE

(71) Applicants: GM Global Technology Operations LLC, Detroit, MI (US); Teijin Limited, Osaka (JP)

(72) Inventors: Xiaosong Huang, Novi, MI (US); Selina X. Zhao, Rochester Hills, MI (US); Elisabeth J. Berger, Farmington Hills, MI (US); William R. Rodgers, Bloomfield Township, MI (US); Tomohiro Ryutani, Rochester, MI (US); Glen Novak, Bruce Township, MI (US)

(73) Assignees: GM GLOBAL TECHNOLOGY OPERATIONS LLC, Detroit, MI (US); TEIJIN LIMITED, Osaka (JP)

( * ) Notice: Subject to any disclaimer, the term of this patent is extended or adjusted under 35 U.S.C. 154(b) by 340 days.

(21) Appl. No.: 15/144,625

(22) Filed: May 2, 2016

(65) Prior Publication Data
US 2017/0313002 A1 Nov. 2, 2017

(51) Int. Cl.
*B29C 73/10* (2006.01)
*B29C 35/08* (2006.01)
(Continued)

(52) U.S. Cl.
CPC .......... *B29C 73/10* (2013.01); *B29C 35/0805* (2013.01); *B29C 70/443* (2013.01);
(Continued)

(58) Field of Classification Search
CPC .... B29C 73/10; B29C 35/0805; B29C 70/443
See application file for complete search history.

(56) References Cited

U.S. PATENT DOCUMENTS 3,837,965 A 9/1974 Mahon et al.
4,409,270 A * 10/1983 Faber .................... B29C 73/02
156/94
(Continued)

FOREIGN PATENT DOCUMENTS

CN 1258247 A 6/2000
CN 101535823 A 9/2009
(Continued)

OTHER PUBLICATIONS

First Office Action in German Application No. 102017100509.9 from the German Patent Office dated Nov. 27, 2017 and correspondence from Manitz, Finsterwald & Partner summarizing the First Office Action; 6 pages.
(Continued)

*Primary Examiner* — Jacob T Minskey
*Assistant Examiner* — Melody Tsui
(74) *Attorney, Agent, or Firm* — Harness, Dickey & Pierce, P.L.C.

(57) ABSTRACT

Methods of repairing a defect in a polymeric composite structure are provided. The methods include disposing a patch over a defect in a polymeric composite structure; disposing a textured sheet over the polymeric patch, applying pressure to the polymeric patch and the textured sheet; and heating the polymeric patch. The textured sheet has a surface texture that is a negative of a surface texture of the polymeric composite structure.

15 Claims, 7 Drawing Sheets

US 10,589,477 B2

Page 2

(51) Int. Cl.
  *B29C 70/44* (2006.01)
  *B29K 101/12* (2006.01)
  *B29K 105/00* (2006.01)
(52) U.S. Cl.
  CPC ... *B29C 2035/0811* (2013.01); *B29K 2101/12* (2013.01); *B29K 2105/256* (2013.01)

(56) References Cited

U.S. PATENT DOCUMENTS

| | | |
|---|---|---|
| 4,434,832 A | 3/1984 | Koch et al. |
| 4,472,473 A | 9/1984 | Davis et al. |
| 4,485,135 A | 11/1984 | Koch |
| 4,865,674 A | 9/1989 | Durkin |
| 4,948,443 A | 8/1990 | Speer |
| 5,024,818 A | 6/1991 | Tibbetts et al. |
| 5,829,716 A | 11/1998 | Kirkwood et al. |
| 5,833,795 A * | 11/1998 | Smith ............... B29C 73/02 156/272.4 |
| 5,853,865 A | 12/1998 | McHugh et al. |
| 6,039,824 A | 3/2000 | Van Haandel |
| 6,200,686 B1 | 3/2001 | Ozaki et al. |
| 6,206,067 B1 | 3/2001 | Kociemba et al. |
| 6,468,372 B2 * | 10/2002 | Kociemba ......... B29C 43/3642 156/285 |
| 6,781,099 B2 | 8/2004 | Krah |
| 6,843,945 B1 | 1/2005 | Lee et al. |
| 6,872,294 B2 | 3/2005 | Lee et al. |
| 6,875,471 B2 | 4/2005 | Lee et al. |
| 6,911,169 B2 | 6/2005 | Kwag et al. |
| 7,846,366 B2 | 12/2010 | Iobst et al. |
| 7,981,501 B2 | 7/2011 | Kwag et al. |
| 8,043,543 B2 | 10/2011 | Wang et al. |
| 8,309,644 B1 | 11/2012 | Huang |
| 8,449,810 B2 | 5/2013 | Rousseau |
| 8,475,884 B2 | 7/2013 | Kia |
| 8,486,321 B2 | 7/2013 | Kia |
| 8,545,650 B2 | 10/2013 | Evens et al. |
| 8,597,562 B2 | 12/2013 | Wang et al. |
| 8,641,957 B2 | 2/2014 | Atkins et al. |
| 8,668,247 B2 | 3/2014 | Kia et al. |
| 8,814,255 B2 | 8/2014 | Yamaji et al. |
| 8,840,827 B2 | 9/2014 | Iobst et al. |
| 8,852,733 B2 | 10/2014 | Kwag et al. |
| 8,882,183 B2 | 11/2014 | Suzuki et al. |
| 8,946,342 B2 | 2/2015 | Konagai et al. |
| 8,991,900 B2 | 3/2015 | Yamaji et al. |
| 9,017,499 B2 | 4/2015 | Evens et al. |
| 9,054,387 B2 | 6/2015 | Viavattine et al. |
| 9,132,859 B2 | 9/2015 | Yamaji et al. |
| 9,475,238 B2 | 10/2016 | Suhara et al. |
| 9,878,502 B2 | 1/2018 | Helfrich et al. |
| 10,160,172 B2 | 12/2018 | Huang et al. |
| 2004/0131769 A1 * | 7/2004 | Saxon ............... B29C 73/02 427/140 |
| 2006/0057335 A1 | 3/2006 | Wang et al. |
| 2006/0148590 A1 | 7/2006 | Sullivan et al. |
| 2006/0158001 A1 | 7/2006 | Emch et al. |
| 2008/0128078 A1 | 6/2008 | May et al. |
| 2010/0136866 A1 | 6/2010 | Kwag et al. |
| 2011/0021737 A1 | 1/2011 | Tadepalli et al. |
| 2012/0107509 A1 | 5/2012 | Scherzer et al. |
| 2012/0211144 A1 | 8/2012 | Litzenberger et al. |
| 2012/0213997 A1 | 8/2012 | Wang et al. |
| 2013/0089733 A1 | 4/2013 | Raghavan et al. |
| 2013/0122262 A1 | 5/2013 | Nagakura et al. |
| 2013/0149501 A1 | 6/2013 | Pacchione et al. |
| 2013/0272780 A1 | 10/2013 | Takeuchi et al. |
| 2013/0309001 A1 | 11/2013 | Teshima et al. |
| 2013/0344282 A1 | 12/2013 | Yagi et al. |
| 2014/0004308 A1 | 1/2014 | Taniguchi et al. |
| 2014/0039114 A1 | 2/2014 | Hagihara et al. |
| 2015/0001768 A1 * | 1/2015 | Kia ............... B29C 73/30 264/484 |
| 2015/0108793 A1 | 4/2015 | Peschansky et al. |
| 2015/0328847 A1 | 11/2015 | Kia et al. |
| 2016/0039157 A1 | 2/2016 | Huang et al. |
| 2017/0001389 A1 | 1/2017 | Engel et al. |
| 2017/0066200 A1 | 3/2017 | Zhang et al. |
| 2017/0203524 A1 | 7/2017 | Huang et al. |
| 2017/0305044 A1 | 10/2017 | Terasaka et al. |
| 2018/0361690 A1 | 12/2018 | Huang et al. |

FOREIGN PATENT DOCUMENTS

| | | |
|---|---|---|
| CN | 102574329 A | 7/2012 |
| CN | 102574339 A | 7/2012 |
| CN | 104275811 A | 1/2015 |
| CN | 105365232 A | 3/2016 |
| CN | 106976256 A | 7/2017 |
| CN | 107336449 A | 11/2017 |
| CN | 109109348 A | 1/2019 |
| DE | 4019744 A1 | 1/1992 |
| DE | 102005011977 A1 | 2/2006 |
| DE | 102007026099 A1 | 12/2008 |
| DE | 102011014017 A1 | 9/2012 |
| DE | 102011076463 A1 | 11/2012 |
| DE | 102012207468 A1 | 11/2013 |
| DE | 102013112933 A1 | 5/2015 |
| DE | 102015112874 A1 | 2/2016 |
| DE | 102015008312 A1 | 1/2017 |
| DE | 102017100509 A1 | 7/2017 |
| DE | 102013004232 B4 | 8/2017 |
| DE | 102017109362 A1 | 11/2017 |
| DE | 102016115284 A1 | 2/2018 |
| DE | 102018114194 A1 | 12/2018 |
| EP | 1755871 A2 | 2/2007 |
| FR | 2742691 A1 | 6/1997 |
| FR | 2981882 A1 | 5/2013 |
| FR | 3050684 A1 | 11/2017 |
| JP | S58191123 A | 11/1983 |
| JP | S59223784 A | 12/1984 |
| JP | 2000143743 A | 5/2000 |
| JP | 2002511030 A | 4/2002 |
| JP | 3294808 B2 | 6/2002 |
| JP | 2002294160 A | 10/2002 |
| JP | 20061125 A | 1/2006 |
| JP | 2009143985 A | 7/2009 |
| JP | 2010137527 A | 6/2010 |
| JP | 2013503763 A | 2/2013 |
| JP | 2013512808 A | 4/2013 |
| JP | 2013525949 A | 6/2013 |
| JP | 2014188995 A | 10/2014 |
| JP | 2017141437 A | 8/2017 |
| JP | 2017206685 A | 11/2017 |
| WO | WO-1994012338 A1 | 6/1994 |
| WO | WO-2008036786 A2 | 3/2008 |
| WO | WO-2012/102315 A1 | 8/2012 |
| WO | WO-2012/105080 A1 | 8/2012 |
| WO | WO-2012/105387 A1 | 8/2012 |
| WO | WO-2012/105389 A1 | 8/2012 |
| WO | WO-2012/105716 A1 | 8/2012 |
| WO | WO-2012/105717 A1 | 8/2012 |
| WO | WO-2012/108446 A1 | 8/2012 |
| WO | WO-2012/117593 A1 | 9/2012 |
| WO | WO-2012/140793 A1 | 10/2012 |
| WO | WO-2013113676 A2 | 8/2013 |
| WO | WO-2015087905 A1 | 6/2015 |
| WO | 2016084861 A1 | 6/2016 |

OTHER PUBLICATIONS

First Office Action in German Application No. 102017109362.1 from the German Patent Office dated Mar. 22, 2018 and correspondence from Manitz, Finsterwald & Partner summarizing the First Office Action; 5 pages.

Notification of Reasons for Refusal and First Search Report in Japanese Application No. 2017-003799 from the Japanese Patent Office dated Feb. 1, 2018; 15 pages.

First Office Action for Chinese Patent Application No. 201710292244.5 dated Dec. 3, 2018 with correspondence dated Dec. 11, 2018 from China Patent Agent (H.K.) Ltd. summarizing contents, 11 pages.

(56) References Cited

OTHER PUBLICATIONS

First Office Action for Chinese Patent Application No. 201710079859.X dated Aug. 28, 2018 with correspondence dated Aug. 31, 2018 from China Patent Agent (H.K.) Ltd. summarizing contents, 12 pages.
First Office Action and Search Report for Japanese Application No. 2017-091003 dated Oct. 2, 2018 with English language machine translation; 12 pages.
Preliminary Search Report for French Application No. 1753836 dated Mar. 4, 2019 with correspondence from Regimbeau European Patent and Trademark Attorneys dated Mar. 20, 2019 summarizing contents, 11 pages.
First Office Action for German Patent Application No. 102018114194.7 dated May 15, 2019 with correspondence dated May 24, 2019 from Manitz Finsterwald and Partner summarizing contents, 6 pages.
He, Z., Satarkar, N., Xie, T., Cheng, Y.-T. and Hilt, J. Z.; "Remote Controlled Multishape Polymer Nanocomposites with Selective Radiofrequency Actuations"; Adv. Mater., 23; 2011; pp. 3192-3196.
A First Office Action in German Application No. 102015112874.8 from the German Patent Office dated Sep. 8, 2016 and correspondence from Manitz, Finsterwald & Partner summarizing the First Office Action; 5 pages.
A First Office Action in Chinese Application No. 201510601690.0 from the Chinese Patent Office dated Mar. 30, 2017; 17 pages.
Huang et al.; U.S. Appl. No. 15/624,240, filed Jun. 15, 2017 entitled "Heating Elements for Repair of Molding Defects for Carbon Fiber Thermoplastic Composites"; 46 pages.

\* cited by examiner

COSMETIC REPAIR OF A THERMOPLASTIC CARBON FIBER COMPOSITE

FIELD

The present disclosure relates to the repair of carbon fiber composites by using repair patches.

BACKGROUND

This section provides background information related to the present disclosure which is not necessarily prior art.

Vehicle bodies desirably manage the loads applied both during normal service conditions, as well as under extraordinary conditions, such as a collision or during exposure to other excessive forces or impact. Increasingly, vehicle bodies are constructed using materials such as polymer-based composites that offer higher strength to weight ratios than the low carbon steel used in conventional designs. Polymeric composites in particular are useful in automobiles, and their utilization is expected to continue increasing in the future in an effort to further reduce the vehicle mass. However, polymeric composites pose greater difficulties when requiring repair in comparison to conventional metal materials. Accordingly, the development of an effective repair method for defects in damaged or scratched composite structures will remain important.

SUMMARY

This section provides a general summary of the disclosure, and is not a comprehensive disclosure of its full scope or all of its features.

The current technology provides a method for repairing a defect in a polymeric composite structure. The method includes disposing a patch, which may be a polymeric patch, over a defect in a polymeric composite structure. The method also includes disposing a textured sheet over the polymeric patch. The textured sheet has a first surface texture that is a negative of a second surface texture of the polymeric composite structure. Pressure may then be applied to the polymeric patch and the textured sheet. The method further includes heating the polymeric patch. In this manner, a defect in the polymeric composite structure may be repaired.

The current technology also provides another method of repairing a defect in a polymeric composite structure. The method optionally includes filling a defect in a polymeric composite structure having a surface texture with a filling material. Then a polymeric patch is disposed over the defect, where the polymeric patch has a first color that matches a second color of the polymeric composite structure. A textured sheet is disposed over the polymeric patch, wherein the textured sheet has a surface texture that is a negative of the surface texture of the polymeric composite structure. A source of heat may be disposed over the textured sheet, while a source of pressure may be disposed over the source of heat. The method also includes applying pressure to the polymeric patch and the textured sheet, followed by heating the polymeric patch with a source of heat disposed over the textured sheet. The heating causes the polymeric patch to adhere to the polymeric composite structure. The applying of pressure causes the textured sheet to transfer the first surface texture to the polymeric patch, such that the polymeric patch has a third surface texture that matches the second surface texture of the polymeric composite structure.

Additionally, the current technology provides a method of repairing a defect in a corrugated polymeric composite structure. The method includes disposing a patch over a defect in a corrugated polymeric composite structure that has a first corrugated surface. Then, a rigid plate that has a second corrugated surface that matches or is complementary to the first corrugated surface is disposed over the corrugated polymeric composite structure in a region corresponding to where the patch is disposed. The method further includes heating the patch with a heat blanket or an induction heater.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
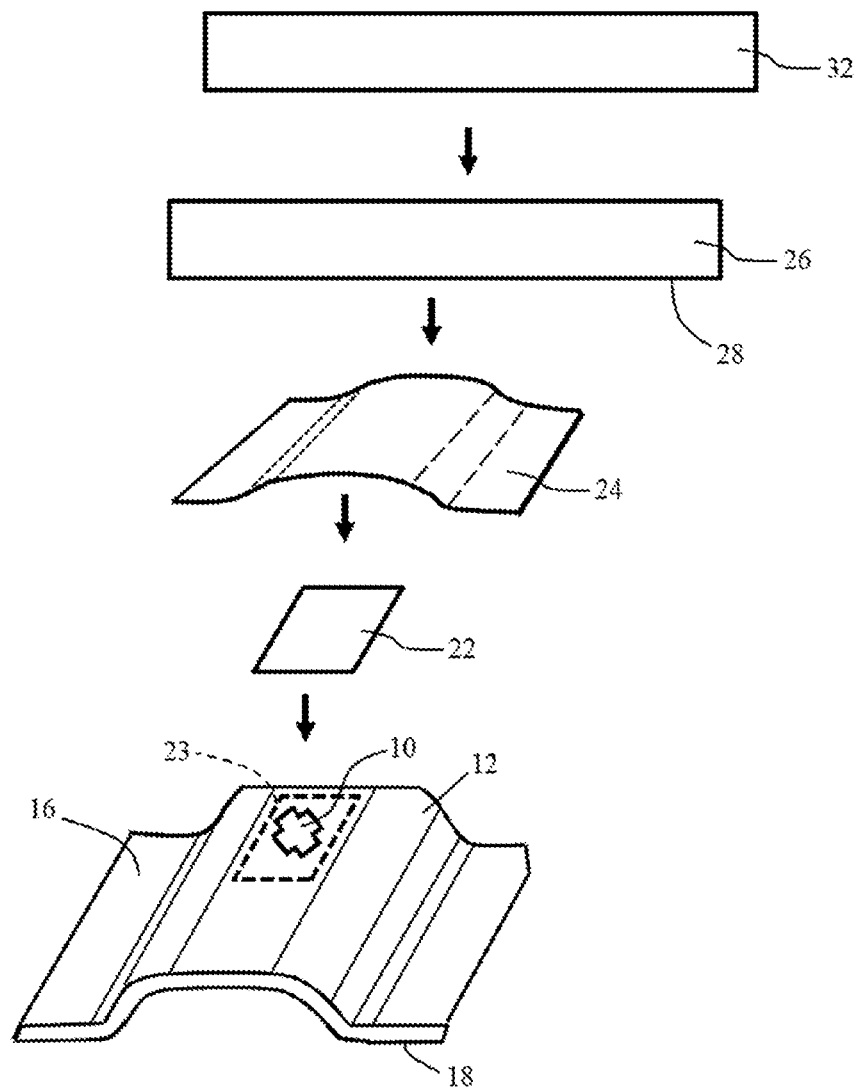
FIG. 1 is a schematic illustration of a method for repairing a defect in a polymeric composite structure according to certain aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B.

Example embodiments will now be described more fully with reference to the accompanying drawings.

Polymeric composites are widely used in vehicles, such as automobiles, motorcycles, boats, tractors, buses, mobile homes, campers, and tanks, and their utilization will be increasing in the future with efforts to further reduce vehicle mass. Reinforced composites are particularly suitable for use in components of an automobile or other vehicle (e.g., motorcycles, boats), but may also be used in a variety of other industries and applications, including aerospace components, industrial equipment and machinery, farm equipment, heavy machinery, by way of non-limiting example. For example, reinforced composites may be used to form automotive structural components having contoured or complex three-dimensional shapes. Non-limiting examples include gas tank protection shields, underbody shields, structural panels, door panels, interior floors, floor pans (e.g., of a cargo van), roofs, exterior surfaces, storage areas, including glove boxes, console boxes, trunks, trunk floors, truck beds, and the like.

Compared to existing metallic materials, polymeric composites require different repair methods. Therefore, the development of effective repair methods for damaged polymeric composite structures is needed. For cosmetic repairs, materials used to fill in surface defects desirably have a good adhesion with a parent polymeric composite structure to ensure repair durability and have a color and texture that match the color and texture of the parent polymeric composite. Conventional methods used for cosmetic repairs of polymeric composite structures do not reliably provide good UV resistance, abrasion resistance, and matching aesthetics. Accordingly, new methods for repairing cosmetic defects in polymeric composite structures are desirable.

In various aspects, the present disclosure provides methods of repairing a defect in a polymeric composite structure with a polymer patch. A polymeric composite comprises at least one polymer and at least one reinforcement material. In certain aspects, the polymer may be a thermoplastic polymer. For example, the polymeric composite structure may be a thermoplastic carbon fiber reinforced composite. The defect can be cosmetic, such as a crack, groove, or pit, or the defect can be structural, such as a large crack that spans two surfaces of a polymeric composite structure or a hole. A structural defect can be a site that facilitates crack propagation or other failure mechanisms, while a cosmetic defect detracts from aesthetics of the exposed region(s) of the polymeric composite structure. The polymeric composite structure can be any structure composed of a polymeric composite material on a vehicle, such as, for example, a panel. Accordingly, the polymeric composite structure can be a smooth panel, a curved panel, or a corrugated panel, such as a panel used in a truck bed or any of the applications previously discussed above. In certain aspects, the polymer patch used to repair a defect in the polymeric composite structure is a thermoplastic patch that comprises a thermoplastic polymer. In certain other aspects, the polymeric patch may be a polymeric composite material. The polymeric patch may have a composition that is the same as a composition of the polymeric composite structure, including having the same reinforcement material at the same levels (e.g., similar fiber content), or have a different polymer composite composition and/or fiber content as the polymeric composite structure. For example, the polymeric patch may have a composition that is the same as a composition of the polymeric composite structure, but include a fiber content that is less than or greater than the fiber content in the polymeric composite structure.

With reference to FIG. 1, the current technology provides an exemplary method of repairing a defect 10 in a polymeric composite structure 12 composed of a polymeric composite. The polymeric composite structure 12 may be a section of a vehicle, such as a body panel or a panel defining a floor of a truck bed. The defect 10 can be a cosmetic defect or a structural defect. In certain embodiments, such as when the defect 10 is a deep scratch, gouge, hole, or puncture, the method may include filling the defect 10 with a filling material, as described further below. In other embodiments, such as when the defect 10 is a shallow scratch, filling the defect 10 with a filling material is not necessary. As shown in FIG. 1, the polymeric composite structure 12 includes a visibly exposed surface 16 and a visibly unexposed surface 18.

Figure 2A:
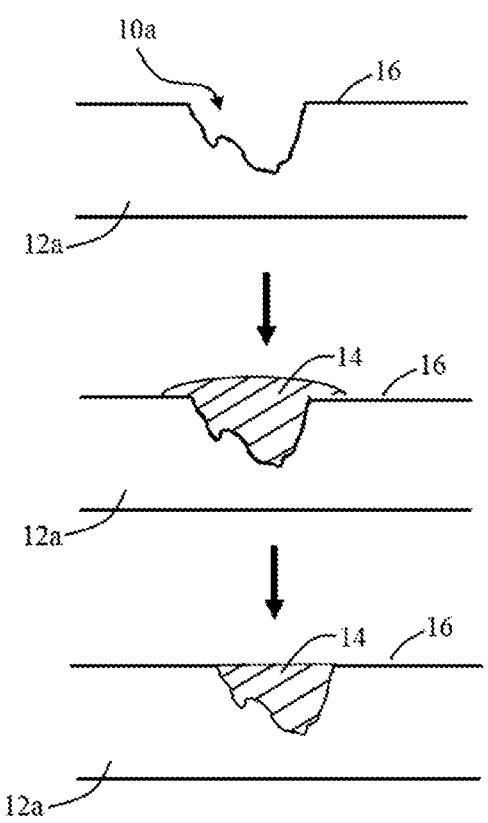
FIG. 2A is an illustration of a repair of cosmetic defect according to certain aspects of the present disclosure.
Figure 2B:
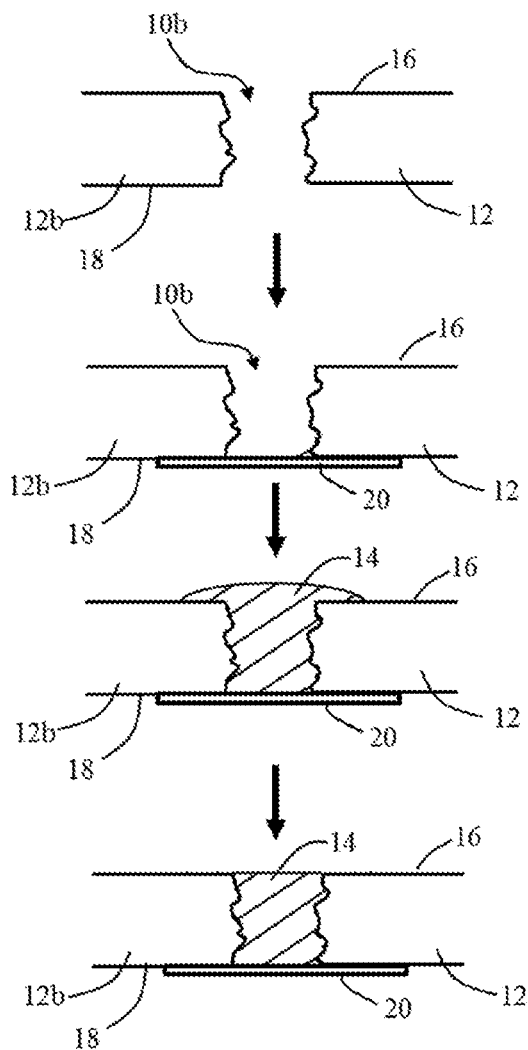
FIG. 2B is an illustration of a repair of a structural defect according to certain other aspects of the present disclosure.

FIGS. 2A and 2B show cross sections of a polymeric composite structure like polymeric composite structure 12 in FIG. 1. In FIG. 2A, a cosmetic defect 10a is shown in a polymeric composite structure 12a, while in FIG. 2B, a structural defect 10b is shown in a polymeric composite structure 12b. As shown in FIGS. 2A and 2B, in certain embodiments, the current method includes filling the defect in the polymeric composite structure with a filling material 14. More particularly, FIG. 2A shows a cosmetic defect 10a in the form of a scratch or gouge in the polymeric composite structure 12a. The method in FIG. 2A may include filling the cosmetic defect 10a with a filling material 14. The filling material 14 can be any filling material that hardens to fill the defect 10a. Examples of suitable filling materials 14 include thermoplastics, such as polyamides, acrylics, polycarbonates, thermoplastic polyesters, polysulfone, and copolymers thereof as non-limiting examples, and thermosets, such as polyimides, epoxy, vinyl ester, polyester, acrylates, and polyurethanes, as non-limiting examples. As shown in FIG. 2A, the filling material 14 is leveled out, for example, via scraping or smoothing it out, such that the filling material 14 is flush with an exposed, i.e., visible, surface 16 of the polymeric composite structure 12.

FIG. 2B shows polymeric composite structure 12b, which is similar to polymeric composite structure 12a in FIG. 2A, but instead has a structural defect 10b in the form of a hole that extends from the exposed surface 16 to an unexposed, i.e., not visible, surface 18. As shown in FIG. 2B, the method includes attaching a plate 20 to the unexposed surface 18, such that the plate 20 spans the defect 10b. The plate 20 can be composed of any material that is capable of supported the filling material 14. As non-limiting examples, the plate 20 can be composed of metal, an alloy, steel, fiber glass, a polymer, or a polymer composite. Attaching the plate 20 to the unexposed surface 18 of the polymeric composite structure 12 can be performed by any method known in the art, such as, for example, with adhesive, hardware, i.e., screws, or a combination thereof. As shown in FIG. 2B, the method includes filling the structural defect 10b with the filling material 14. Then, as shown in FIG. 2B, the filling material 14 is scraped or smoothed out, such that the filling material is flush with an exposed, i.e., visible, surface 16 of the polymeric composite structure.

In FIGS. 2A and 2B, the method also includes solidifying, drying or polymerizing the filling material 14, such that the filling material hardens and fills the cosmetic defect 10a or structural defect 10b. Depending on the composition of the filling material 14, solidifying, drying, or polymerizing the filling material 14 may include heating the filling material 14, adding an activator to the filling material 14, exposing the filling material 14 to ultra violet (UV) light, incubating for a period of time, or a combination thereof. After the filling material 14 is applied, smoothed, and polymerized, the polymeric composite structure is ready for further processing to repair the defect in accordance with certain aspects of the present disclosure.

Referring back to FIG. 1, the method includes disposing a patch 22 over the defect 10 in the polymeric composite structure 12. Positioning of the patch 22 over the defect 10 is illustrated by a patch outline 23 on the polymeric composite structure 12. Disposing the patch 22 is performed whether the defect 10 is filled with a filling material or not. When the defect is filled with a filling material, the patch 22 is disposed over the defect 10 after the filling material has hardened. The patch 22 is composed of a polymeric material, such as a thermoplastic polymer or an uncured thermoset polymer. Accordingly, the patch 22 may be a thermoset polymeric patch, a thermoplastic polymeric patch. In certain variations, the polymeric patch is a polymeric composite patch having a polymer and a reinforcement material dispersed therein. The patch 22 has a thickness sufficient to cover a repaired surface and fill gaps, while being thin enough to mask or camouflage, i.e., blend into, the polymeric composite structure 12. Therefore, the patch 22 optionally has a thickness of from greater than or equal to about 1 μm to less than or equal to about 1 mm. In certain aspects, the patch 22 substantially matches the color and/or composition of the polymeric composite structure 12, such that after the method is complete, the patch 22 covers the defect 10 and is not visible or only slightly visible. Alternatively, the patch 22 may be transparent, such that the color of the polymeric composite structure 12 shows through the patch 22. Accordingly, color matching may be performed by visual inspection. Fillers, such as carbon black or titanium dioxide, as non-limiting examples, may be included in the patch material to finely adjust the color of the patch material to match the polymeric composite structure 12. In other aspects, the patch 22 need not match the color and/or composition of the polymeric composite structure 12. In certain variations, suitable patch materials also include the same polymer matrix or resin as the polymeric composite structure 12, but do not include reinforcing fibers.

In other aspects, the polymeric composite structure 12 and patch 22 may be composed of any fiber-reinforced composite material disclosed in U.S. Patent Publication Nos. 2013/0122262, 2013/0272780, and 2015/0108793, and PCT International Publication Nos. WO 2012/117593, WO 2012/105716, WO 2012/102315, WO 2012/105080, WO 2012/105387, WO 2012/105389, WO 2012/105717, WO 2012/108446 and WO 2012/140793, each of which is respectively incorporated herein by reference in its entirety. In various aspects, the patch 22 may be composed of either the same fiber-reinforced composite material as the polymeric composite structure 12 or a different fiber-reinforced composite material as the polymeric composite structure 12 that is compatible with the polymeric composite structure 12. Furthermore, the patch 22 may be composed of the same fiber-reinforced composite material as the polymeric composite structure 12, but with a higher or lower fiber content.

Thus, the patch 22 may be composed of patch materials comprising a polymer matrix or resin reinforced with a reinforcing fiber. Suitable non-limiting examples of fibers for the patch 22 or polymeric composite structure 12 include carbon fibers, glass fibers (such as fiber glass or quartz), aramid fibers (such as KEVLAR® para-aramid synthetic fiber and TWARON® para-aramid synthetic fiber), boron fibers, ceramic fibers, polyester fibers, ultra-high molecular weight polyethylene (UHMWPE) fibers, hemp fibers, basalt fibers, and combinations thereof. The fibers may be provided as fiber mats having interconnecting or contacting fibers or may be randomly distributed individual fibers within the resin matrix. Suitable fibers may include relatively short length fibers (having lengths of ≥about 0.1 mm to ≤about 10 mm), relatively long length fibers (having lengths of ≥about 10 mm to ≤about 100 mm), or continuous fibers (having lengths of ≥about 100 mm), and may include any combinations thereof. Long length fibers can provide good balance of moldability/productivity/mechanical performance. The fibers may be chopped, as well.

The fibers within the polymeric composite material or patch may be configured in a random-oriented manner, for example, in a substantially two-dimensionally-random oriented or in a specific-direction-oriented manner. In certain variations, a fiber mat may be used with highly planar oriented or uni-directional oriented fibers or a combination thereof. The fiber mat may have a random-oriented fiber for good balance of moldability/productivity/mechanical performance. In certain variations, a random fiber mat can be used. The random mat may include reinforcing fibers having an average fiber length of greater than or equal to about 3 mm to less than or equal to about 100 mm and a thermoplastic resin. Such a random fiber mat is further described in WO 2012/105080 discussed above. In addition, a unidirectional oriented carbon fiber layer may be included in order to enhance local stiffness and strength for the load-carrying support structure. In various embodiments, the patch material has a fiber concentration less than or equal to the fiber concentration in the polymeric composite structure.

As discussed above, the patch material is composed of a reinforcing material dispersed in a polymeric matrix or resin, which may be the same or different as the polymeric composite structure material. By way of non-limiting example, the polymer resin may include: polyamide resin (such as PA6, PA11, PA12, PA46, PA66, PA610, or capro- lactam), vinyl ester, phenolic resins, bismaleimides, polyamide imide resin, polyimide resin, vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyether imide resin, polyphenylenesulfide resin, polybenzimidazole resin, polyacetal resin, polycarbonate resin, polyethylene terephthalate resin, polyethylene naphthalate resin, polybutylene terephthalate resin, polyacrylate resin, polyarylethersulfone resin, polyphenylene ether resin, polyphenylene sulfide resin, polysulfone resin, polyether sulfone resin, polyether ether ketone resin, polylactide resin, polycarbonate resin, or any combination or copolymer of these resins. Accordingly, non-limiting examples of patch materials, i.e., thermoplastic patch materials, include polyesters (including polyethylene terephthalate (PET)), polyurethane, polyolefin, poly(acrylic acid) (PAA), poly(methyl acrylate) (PMA), poly(methyl methacrylate) (PMMA), acrylonitrile butadiene styrene (ABS), polyamides (including polycaprolactam (nylon)), polylactic acid (PLA), polybenzimidazole, polycarbonate, polyether sulfone (PES), polyetherether ketone (PEEK), polyetherimide (PEI), polyethylene (PE; including ultra-high molecular weight polyethylene (UHMWPE), medium-density polyethylene (MDPE), low-density polyethylene (LDPE), and cross-lined polyethylene (PEX)), polyphenylene oxide (PPO), polyphenylene sulfide (PPS), polypropylene (PP), polystyrene (PS), polyvinyl chloride (PVC), polytetrafluoroethylene (PTFE), co-polymers thereof, and combinations thereof.

As appreciated by those of skill in the art, the fiber reinforced composite material may further include other conventional ingredients, including other reinforcement materials, functional fillers or additive agents, like organic/inorganic fillers, fire-retardants, anti-ultraviolet radiation agents (UV stabilizers), anti-oxidants, colorants or pigments, such as carbon black powder, mold release agents, softeners, plasticizing agents, surface active agents, and the like. In regard to the colorants or pigments, they may be used to match the color of the polymeric composite structure 12.

With further reference to FIG. 1, the method also includes disposing a textured sheet 24 over the patch 22. In certain aspects, a surface texture includes a visible pattern, for example, cross-hatching, a grain pattern, or other surface micropatterns. The textured sheet 24 thus has a surface texture or grain that is an inverse of, negative of, or mirror image of a surface texture of the polymeric composite structure 12, such that the surface texture of the polymeric composite structure 12 can be embedded within the patch 22. Also, the textured sheet 24 can be composed of any flexible material known in the art that can withstand elevated pressures and temperatures. In certain embodiments, the textured sheet 24 is composed of silicone, i.e., the textured sheet 24 is a textured silicone sheet. In other embodiments, the textured sheet 24 is a textured sheet of heat-resistant rubber or polyimide, or a textured sheet of a soft pliable metal. As described in more detail below, the surface texture of the textured sheet 24 will be transferred to the patch 22, such that the patch 22 has a surface texture or grain that matches the surface texture or grain of the polymeric composite structure 12. Accordingly, after completion of the method, the patch 22 will have the same texture as the polymeric composite structure 12, such that the patch 22 visually blends with the exposed surface 16 of the polymeric composite structure 12. In embodiments, where the polymeric composite structure 12 has no surface texture, i.e., is smooth, the textured sheet is not necessary. Similarly, when other components employed in the method have a surface texture that matches the surface texture of the polymeric composite structure 12, as discussed further herein, the textured sheet is not necessary.

The method further includes disposing or applying a source of heat, i.e., a heating element, 26 to the textured sheet 24 when present or to the patch 22 when the textured sheet 24 is not present. For example, the source of heat 26 has a lower surface 28 that contacts the textured sheet 24 or patch 22. In some embodiments, the lower surface 28 of the source of heat 26 includes a texture or grain that is a negative of the texture or grain in the polymeric composite structure 12. In such embodiments, a texture is transferred from the lower surface 28 of the source of heat 26 to the patch 22 and the textured sheet 24 is not necessary. The source of heat 26 can be any source of heat known in the art, such as a heat blanket or an induction heater.

Figure 3A:
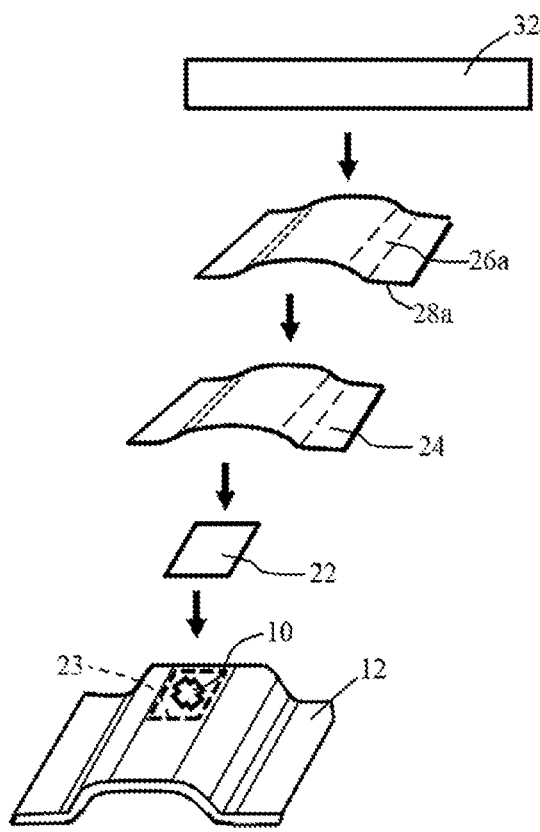
FIG. 3A is an illustration a method for repairing a defect in a polymeric composite structure according to certain aspects of the present disclosure like in FIG. 1, where a heat blanket is used as a heating source.

FIG. 3A shows a method similar to that described in the context of FIG. 1 where the source of heat 26 is a heat blanket 26a. The heat blanket 26a has a lower surface 28a that contacts either the textured sheet 24 when the lower surface 28a does not have a texture or grain that is a negative of the texture or grain of the polymeric composite structure 12 or alternatively contacts the patch 22 when the lower surface 28a does have a texture or grain that is a negative of the texture or grain of the polymeric composite structure 12. Put another way, when the lower surface 28a of the heat blanket 26a includes a texture or grain, the textured sheet 24 is a surface of a heat blanket 26a that contacts an exposed surface 16 of the patch 22.

Figure 3B:
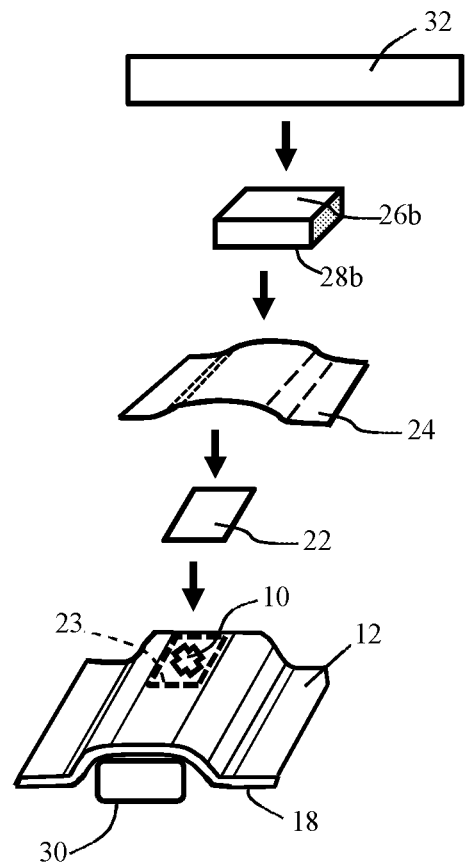
FIG. 3B is an illustration of a method for repairing a defect in a polymeric composite structure according to certain aspects of the present disclosure like in FIG. 1, where an induction heater is used as a heating source.

FIG. 3B shows a method similar to that described in the context of FIG. 1 where the source of heat 26 is induction heat generated from a conductive sheet 26b that is associated with an inducer 30. The conductive sheet 26b has a lower surface 28b that contacts either the textured sheet 24 when the lower surface 28b does not have a texture or grain that is a negative of the texture or grain of the polymeric composite structure 12 or alternatively contacts the patch 22 when the lower surface 28b does have a texture or grain that is a negative of the texture or grain of the polymeric composite structure 12. Accordingly, in certain aspects, the lower surface 28b of the induction heater 26 may have a geometry that matches the geometry of the polymeric composite structure 12. The inducer 30 is disposed on the unexposed surface 18 of the polymeric composite structure 12, such that the patch 22 and textured sheet 24 (when present) are positioned between the induction heater 26b and the inducer 30. Alternatively, the inducer 30 may be disposed on top of the conductive sheet 26b or the source of pressure 32. The inducer 30 cooperates with the conductive sheet 26b to generate heat.

Referring back to FIG. 1, the method further includes applying pressure to the patch 22, the textured sheet 24 (when the textured sheet is needed), and the source of heat 26. The applying pressure to the patch 22 and textured sheet 24 includes applying a source of pressure 32 over the source of heat 26. The source of pressure 32 can be any source of pressure known in the art, such as vacuum bagging mechanical force (such as with a sandbag), or magnetic force (such as with an electromagnet). The applying pressure to the patch 22 comprises applying a standard atmospheric pressure of from greater than or equal to about 0.001 MPa to less than or equal to about 1 MPa, or from greater than or equal to about 0.005 MPa to less than or equal to about 0.1 MPa, to the source of heat 26, textured sheet 24 (when present), patch 22, and polymeric composite structure 12.

Figure 4A:
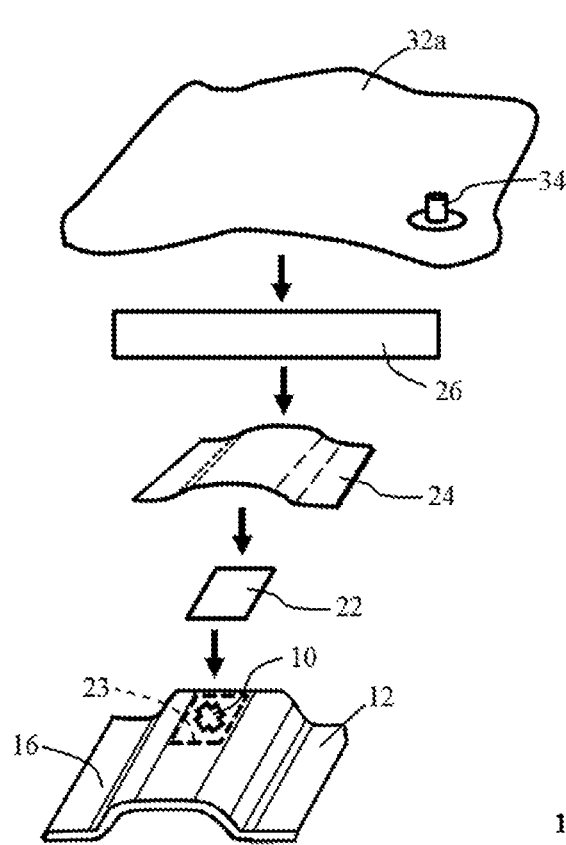
FIG. 4A is an illustration of a method for repairing a defect in a polymeric composite structure according to certain aspects of the present disclosure like in FIG. 1, where a vacuum bag is used as a pressure source.

FIG. 4A shows a method similar to that described in the context of FIG. 1, where the source of pressure 32 is a vacuum bag assembly 32a. The vacuum bag assembly 32a completely covers the components below it, i.e., the source of heat 26, the textured sheet 24 (when present), the patch 22, and the region of the polymeric composite structure 12 having the defect 10, such that the vacuum bag assembly 32a is in continuous contact with the exposed surface 16 of the polymeric composite structure 12. The vacuum bag assembly 32a may be attached to the exposed surface 16 of the polymeric composite structure with, as a non-limiting example, an adhesive putty. The vacuum bag assembly 32a comprises a port 34 that receives a conduit associated with a source of negative pressure. Therefore, the port 34 is in communication with a vacuum bag of the vacuum bag assembly 32a. When the source of negative pressure is operated, a vacuum is created under the vacuum bag assembly 32a, which causes the source of heat 26, textured sheet 24, patch 22, and polymeric composite structure 12 to become forced or squeezed together. In other words, edges of the vacuum bag assembly 32a are sealed against the polymeric composite structure 12 and a vacuum, i.e., a negative pressure, is drawn through the vacuum bag assembly 32a. Moreover, in various embodiments, the source of heat 26 is positioned directly beneath the vacuum bag assembly 32a. Therefore, to prevent the source of heat 26 from melting the vacuum bag, a heat resistant or substantially heat resistant flexible mask may be positioned between the source of heat 26 and the vacuum bag assembly 32a. By "substantially heat resistant," it is meant that the flexible mask does not transmit a sufficient amount of heat through the mask to melt or otherwise adversely affect the vacuum bag assembly 32a. The mask can be composed of any flexible heat resistant material, such as, for example, silicone.

Figure 5A:
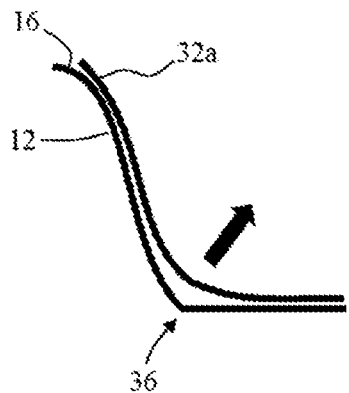
FIG. 5A is an illustration of a vacuum bag being lifted away from a corner or junction of a polymeric composite structure as negative pressure is drawn through the vacuum bag.
Figure 5B:
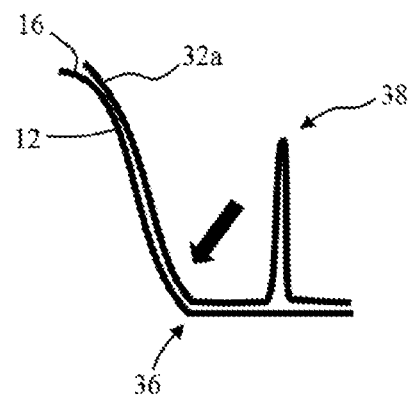
FIG. 5B is an illustration of a vacuum bag being sucked into a corner or junction of a polymeric composite structure due to an inclusion of a pleat in the vacuum bag prior to drawing negative pressure through the vacuum bag in accordance with certain aspects of the present disclosure.

FIG. 5A is an alternative variation that illustrates a potential issue that may occur with the use of the vacuum bag assembly 32a. FIG. 5A shows a cross section view of the polymeric composite substrate 12 and the vacuum bag assembly 32a. When the polymeric composite structure 12 is not flat, i.e., has a curved or corrugated surface, and the vacuum bag assembly 32a is laid flat against the exposed surface 16 of the polymeric composite structure 12, the vacuum bag assembly 32a potentially lifts away from the exposed surface 16 at corners or junctions 36 when the source of negative pressure is activated, as shown by the arrow. This lifting away of the vacuum bag assembly 32a may cause poor contact with polymeric composite structure 12 and negatively affects how the source of heat 26, textured sheet 24, patch 22, and polymeric composite structure 12 are being forced together by the negative pressure. Therefore, as shown in FIG. 5B, pleats 38 may be included in the vacuum bag assembly 32a as it is being disposed on the exposed surface 16 of the polymeric composite structure 12. The pleats 38 may be generated, for example, by providing slack in the vacuum bag assembly 32a adjacent to corners or junctions 36. When negative pressure is applied, the vacuum bag is pulled onto the exposed surface 16 of the polymeric composite structure 12, including at corners or junctions 36 (as shown by the block arrow) more efficiently than when pleats 38 are not utilized.

Figure 4B:
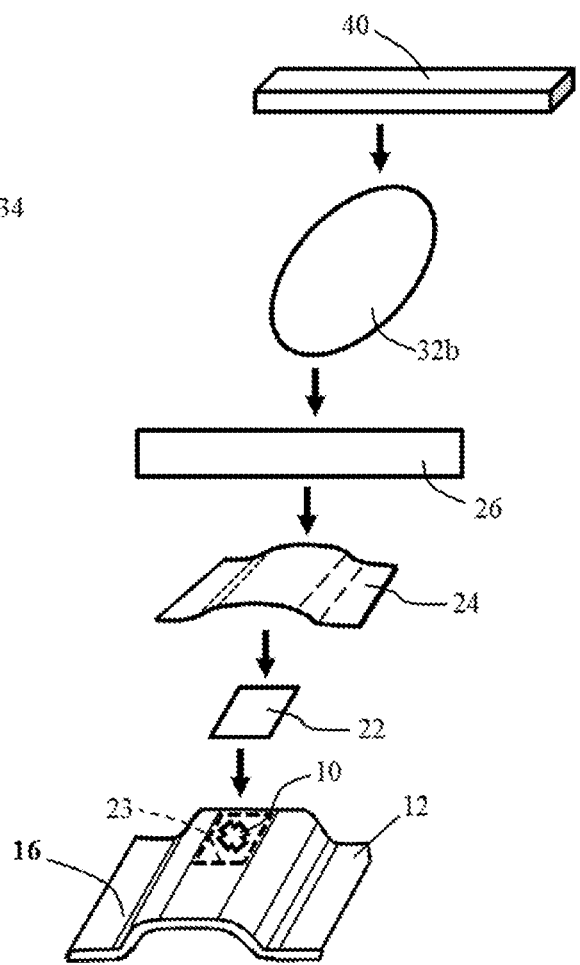
FIG. 4B is an illustration of a method for repairing a defect in a polymeric composite structure according to certain aspects of the present disclosure like in FIG. 1, where a sandbag is used as a pressure source.

FIG. 4B shows a method similar to that described in the context of FIG. 1, where the source of pressure is a sandbag 32b. The sandbag 32b is disposed on the source of heat 26, which forces the source of heat 26, texture sheet 24 (when present), patch 22, and polymeric composite structure 12 together. To increase the pressure provided by the sandbag 32b, a rigid plate 40 can be mechanically pressed against the sandbag 32b in a direction toward the polymeric composite structure 12. In some embodiments, mechanical downward force is pressed against the rigid plate 40.

While pressure causes the polymeric patch 22 to conform to the polymeric composite surface 12, the method includes applying heat to the polymeric patch 22. The heat is supplied or provided by the source of heat 26. The heat slightly melts the patch 22 and optionally a portion of the exposed surface 16 of the polymeric composite structure 12 under the patch 22, such that after the heating, the patch becomes adhered to the polymeric composite structure, thus covering the defect 10. When both the patch 22 and the portion of the exposed surface 16 of the polymeric composite structure 12 under the patch are melted, the melted portions blend together to form a strong bond between the patch 22 and the polymeric composite structure 12. For example, where the patch 22 and polymeric composite structure 12 are composed of the same material, both the patch 22 and a portion of the polymeric composite structure 12 will melt and blend together. Moreover, because the pressure forces the textured sheet 24 (or source of heat 26 including a textured surface) against the patch 22, the texture is transferred to the patch 22 as the patch 22 softens during the heating.

As the polymeric composite structure 12 is heated, the polymer composite softens, which allows fibers embedded within the polymeric composite structure 12 to migrate toward the exposed surface 16 as a result of inherent compressive forces maintained by the polymeric composite that developed during the original process for making the polymeric composite. This phenomenon is referred to as "spring-back." Spring-back leads to a visibly non-uniform region surrounding the patch 22. For example, due to spring-back, fibers in the polymeric composite structure 12 are more visible than in areas where spring-back does not occur, i.e., where the polymeric composite structure 12 is heated less or not at all. Therefore, to prevent or mitigate spring-back, the applying heat to the polymeric patch 22 includes heating the patch 22 to a temperature that is high enough to melt the polymeric patch 22, but low enough to prevent or minimize spring-back or heat deformation of the polymeric composite structure 12. In various embodiments, the temperature does not exceed a temperature that is about 50° C. higher than the melting point of the polymeric composite structure. Therefore, the temperature is highly variable and dependent on the patch material. For example, the heating the patch 22 may comprise heating the patch 22 to a temperature greater than or equal to about 190° C. to less than or equal to about 230° C. Heating is performed for greater than or equal to about 0.1 min to less than or equal to about 120 min or until a sufficient portion of the patch 22 has melted such that the patch 22 adheres to the polymeric composite structure 12 when heating is stopped and the patch cools and hardens.

Figure 6:
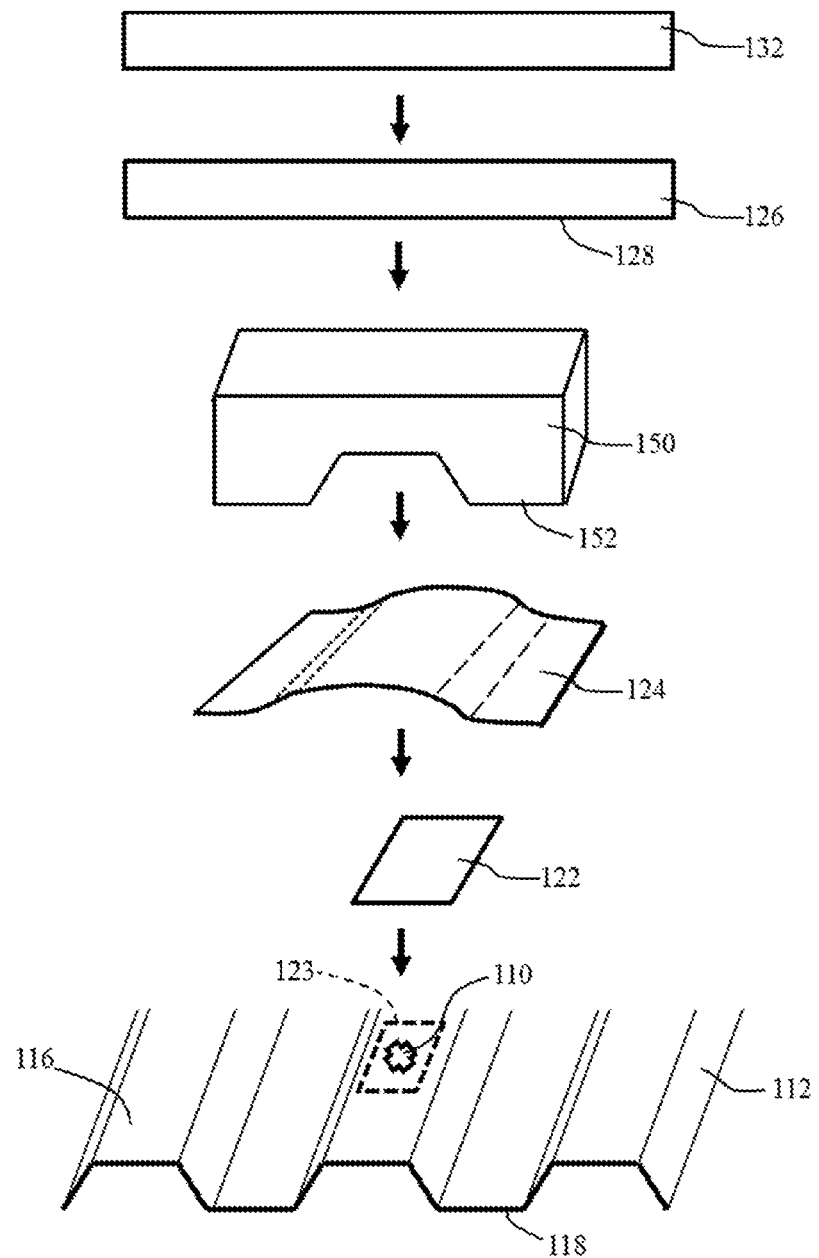
FIG. 6 is an illustration of a method for repairing a cosmetic defect in a corrugated polymeric composite structure according to certain aspects of the present disclosure.

FIG. 6 is an illustration of another method for repairing a defect 110 in a corrugated polymeric composite structure 112. More particularly, FIG. 6 is an illustration of a variation of the method illustrated in FIG. 1. The defect 110 and corrugated polymeric composite structure 112 can be any type of defect or polymeric composite structure described herein, with the exception that the polymeric composite structure 112 is corrugated, i.e., includes repeated sequences of high and low portions (hills/lands and valleys/grooves). However, it is understood that the current method may be applied in regard to polymeric composite structures with irregular surface geometries other than corrugations or to polymeric composite structures with smooth or flat surface geometries. The corrugated polymeric composite structure 112 includes an exposed surfaced, i.e., a first corrugated surface, 116, and an unexposed surface 118.

The method illustrated in FIG. 6 includes disposing a patch 122 over the defect 110 in the corrugated polymeric composite structure 112 and disposing a textured sheet 124 over the patch 122. Disposing the patch 122 and textured sheet 124 are performed as described above in regard to FIG. 1. Positioning of the patch 122 over the defect 110 is illustrated by a patch outline 123 on the polymeric composite structure 112. Like the method shown in FIG. 3B, the method shown in FIG. 6 includes disposing a rigid plate 150 over the textured sheet 124 (when present) and the patch 122 such that a bottom surface 152 of the rigid plate 150 is in contact with the textured sheet 124 or the patch 122. As discussed above, the corrugated polymeric composite structure 112 has a first corrugated surface. Therefore, the bottom surface 152 of the rigid plate 150 has a corresponding or matching corrugation, i.e., a second corrugated surface that allows the rigid plate 150 to be conformingly disposed onto the first corrugated surface of the corrugated polymeric composite structure 112. Therefore, the method includes disposing the rigid plate 150 that has a second corrugated surface 152 that is complementary to the first corrugated surface 116 over a region of the first corrugated surface 116 having the patch 122. Similarly, when the polymeric composite structure 112 has an exposed surface 116 with an irregular geometry, the rigid plate 150 has a surface that is complementary to the irregular geometry of the exposed surface 116. Put another way, the rigid plate 150 has a surface that is complementary to the exposed surface 116 of the polymeric composite structure 112, wherein the exposed surface may have a smooth or flat geometry, a corrugated geometry, or an irregular geometry.

The rigid plate 150 is composed of a heat-conducting material, such as, for example, metal, alloy, steel, or a highly thermally conductive composite, such as a highly filled (i.e., from greater than or equal to about 50% (wt./wt.) to less than or equal to about 90% (wt./wt.)) carbon composite. In certain embodiments, the bottom surface 152 of the rigid plate 150 includes a texture or grain that is a negative of the texture or grain in the corrugated polymeric composite structure 112. In such embodiments, the texture or grain included in the bottom surface 152 of the rigid plate 150 gets transferred to the patch during performance of the method, which makes inclusion of the textured sheet 124 unnecessary.

The method further includes disposing or applying a source of heat 126 to the rigid plate 150. For example, the source of heat 126 has a lower surface 128 that contacts the rigid plate 150. The source of heat 126 can be any source of heat known in the art, such as a heat blanket or an induction heater, as described above.

Figure 7A:
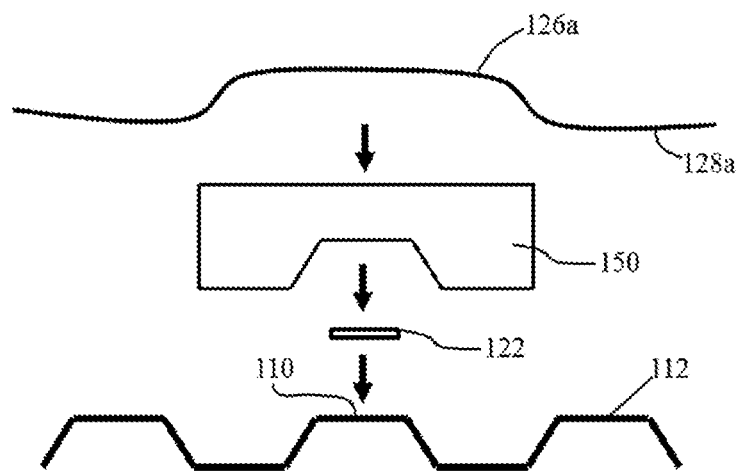
FIG. 7A is an illustration of a method according to certain aspects of the present disclosure like that in FIG. 6, where a heat blanket is used as a heating source.

FIG. 7A shows a method like that in FIG. 6 where the source of heat 126 is a heat blanket 126a. The heat blanket 126a has a lower surface 128a that contacts rigid plate 150. Because the rigid plate 150 conducts heat, heat provided by the heat blanket 126a is transferred through the rigid plate 150 and into the patch 122.

Figure 7B:
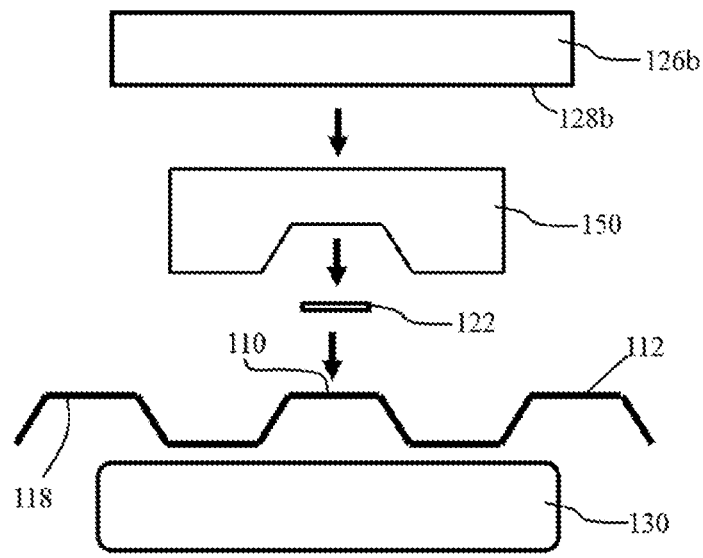
FIG. 7B is an illustration of a method according to certain other aspects of the present disclosure like that in FIG. 6, where an induction heater is used as a heating source.

FIG. 7B shows a method like that in FIG. 6 where the source of heat 126 is induction heat generated from a conductive sheet 126b that is associated with an inducer 130. The conductive sheet 126b has a lower surface 128b that contacts the rigid plate 150. The inducer 130 is disposed on the unexposed surface 118 of the corrugated polymeric composite structure 112, such that the patch 122, textured sheet 124 (when present), and rigid plate 150 are positioned between the induction heater 126b and the inducer 130. Alternatively, the inducer 130 may be disposed on top of the conductive sheet 126b or the source of pressure 132. The inducer 130 cooperates with the conductive sheet 126b to generate heat, which is transferred through the heat-conductive rigid plate 150 and to the patch 122.

In some embodiments, the rigid plate 150 is conductive, such that the inducer 130 cooperates with the rigid plate 150 to generate heat, which is transferred to the patch 122. Therefore, the method illustrated in FIG. 6 optionally includes applying pressure to the patch 122, the textured sheet 24 (when the textured sheet is needed), the rigid plate 150, and the source of heat 26 when the rigid plate 150 is either not heavy enough to provide a sufficient pressure to the patch 122 or additional pressure is desired. The applying pressure includes applying a source of pressure 132 over the source of heat 126. The source of pressure 132 can be any source of pressure known in the art, such as vacuum bagging, mechanical force, or magnetic force. The source of pressure can be applied as discussed above in regard to FIGS. 4A and 4B.

The method illustrated in FIG. 6 also includes applying heat to the polymeric patch 122. The heat is supplied or provided by the source of heat 126. Heating the patch 122 causes the patch to adhere to the corrugated polymeric composite structure 112 as described above in regard to FIG. 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of repairing a defect in a polymeric composite structure, the method comprising:
    filling the defect in its entirety with a filling material, the filling material comprising a thermoplastic polymer or a thermoset polymer;
    smoothing the filling material so that the filling material has a surface that is flush with the exposed surface of the polymeric composite structure;
    hardening the filling material in the defect;
    disposing a polymeric patch over the defect;
    disposing a textured sheet over the polymeric patch, wherein the textured sheet has a first surface texture that is a negative of a second surface texture of the exposed surface of the polymeric composite structure;
    applying pressure to the polymeric patch and the textured sheet;
    heating the polymeric patch so that the polymeric patch softens, and
    cooling the polymeric patch,
    wherein the applying pressure and the heating causes the textured sheet to transfer the first surface texture to the polymeric patch, such that the polymeric patch has a third surface texture that matches the second surface texture of the polymeric composite structure, and
    wherein the cooling causes the polymeric patch to adhere to the polymeric composite structure.

2. The method according to claim 1, wherein a first color of the polymeric patch is visibly the same as a second color as the polymeric composite structure.

3. The method according to claim 1, wherein the polymeric patch comprises a thermoplastic polymer and the polymeric patch has a thickness of from greater than or equal to about 1 µm to less than or equal to about 1 mm.

4. The method according to claim 1, wherein the polymeric patch comprises a polymeric composite having the same polymeric matrix as the polymeric composite structure and optionally the same reinforcing material as the polymeric composite structure.

5. The method according to claim 1, wherein the textured sheet is a flexible textured silicone sheet.

6. The method according to claim 5, further comprising disposing a heating element over the flexible textured silicone sheet, wherein the heating element applies heat for the heating of the polymeric patch.

7. The method according to claim 1, wherein the textured sheet is a surface of a heat blanket that contacts an exposed surface of the polymeric patch, wherein the heat blanket provides heat for the heating the polymeric patch.

8. The method according to claim 1, wherein the applying pressure to the polymeric patch and the textured sheet comprises disposing a vacuum bag over the polymeric patch and textured sheet, such that edges of the vacuum bag are sealed against the polymeric composite structure; and drawing a vacuum through a port in communication with the vacuum bag.

9. The method according to claim 1, wherein the applying pressure to the polymeric patch and the textured sheet comprises disposing a sandbag on top of a source of heat disposed on the textured sheet and optionally applying mechanical force to the sandbag.

10. The method according to claim 1, further comprising:
    disposing a heating element over the textured sheet, wherein the heating element is a heat blanket or an induction heater.

11. The method according to claim 1, wherein the heating the polymeric patch includes heating the polymeric patch to a temperature that does not exceed a temperature that is about 30° C. higher than a melting point of the polymeric composite structure.

12. The method according to claim 1, wherein the polymeric patch and the polymeric composite structure comprise a thermoplastic polymer individually selected from the group consisting of: polyester, polyurethane, polyolefin, poly(acrylic acid), poly(methyl acrylate), poly(methylmethacrylate), acrylonitrile butadiene styrene, polyamides, polylactic acid, polybenzimidazole, polycarbonate, polyether sulfone, polyetherether ketone, polyetherimide, polyethylene, polyphenylene oxide, polyphenylene sulfide, polypropylene, polystyrene, polyvinyl chloride, polytetrafluoroethylene, co-polymers thereof, and the polymeric composite structure further comprises a reinforcement material selected from the group consisting of: carbon fibers, glass fibers, basalt fibers, aramid fibers, boron fibers, ceramic fibers, polyester fibers, ultra-high molecular weight polyethylene fibers, hemp fibers, and combinations thereof.

13. The method according to claim 1, wherein the defect is a structural defect that extends from the exposed surface of the polymeric composite structure to an opposing unexposed surface of the polymeric composite structure, and the method further comprises, prior to the filling:
    attaching a plate to the unexposed surface of the polymeric composite structure so that the plate spans the structural defect.

14. The method according to claim 13, wherein the attaching is performed with an adhesive, with hardware, or with a combination thereof.

15. The method according to claim 13, wherein the plate comprises a metal, an alloy, steel, fiber glass, a polymer, or a polymer composite.

\* \* \* \* \*